July 24, 1928.  
W. N. SUTLIFF  
SLUSH PUMP PISTON  
Filed Nov. 10, 1926  
1,678,365

INVENTOR
WAYNE N. SUTLIFF

ATTORNEY

Patented July 24, 1928.

1,678,365

UNITED STATES PATENT OFFICE.

WAYNE N. SUTLIFF, OF BREA, CALIFORNIA.

SLUSH-PUMP PISTON.

Application filed November 10, 1926. Serial No. 147,588.

Although my present application is entitled as referring to a slush pump piston, it should be understood not only that my invention relates more particularly to a novel type of packing sleeve, for use upon slush pump pistons, but also that said packing sleeve and the piston comprising the same may be employed upon pistons for any desired use.

It is an especial object of my invention to provide a slush pump piston which includes a main body movable by a piston rod and comprising a central section disposed between outwardly extending flanges, said central section and flanges cooperating in the provision of a single annular channel for a packing sleeve which is retained between said flanges in such manner as to permit the respective edges of said sleeve, extending parallel with said flanges, to move outwardly in response to an internal pressure; and, in preferred embodiments of my invention, fluid being admitted into said channel from one or both ends of said body, the central portion of said sleeve is restrained in a manner tending to prevent its participation in the mentioned outward movement.

Other objects of my invention, in which I may use valve means of any preferred type, or valves of the special types hereinafter described, to prevent or check return movement of fluid from said annular channel, and in which the central portion of said packing sleeve may be inwardly enlarged and/or provided with a band-like interior or other reinforcement, may be best appreciated from illustrative embodiments of my invention, taken in connection with the appended claims and the accompanying drawings, in which:

Fig. 1 may be referred to as a median longitudinal section through a pump plunger embodying my invention.

Figure 1:
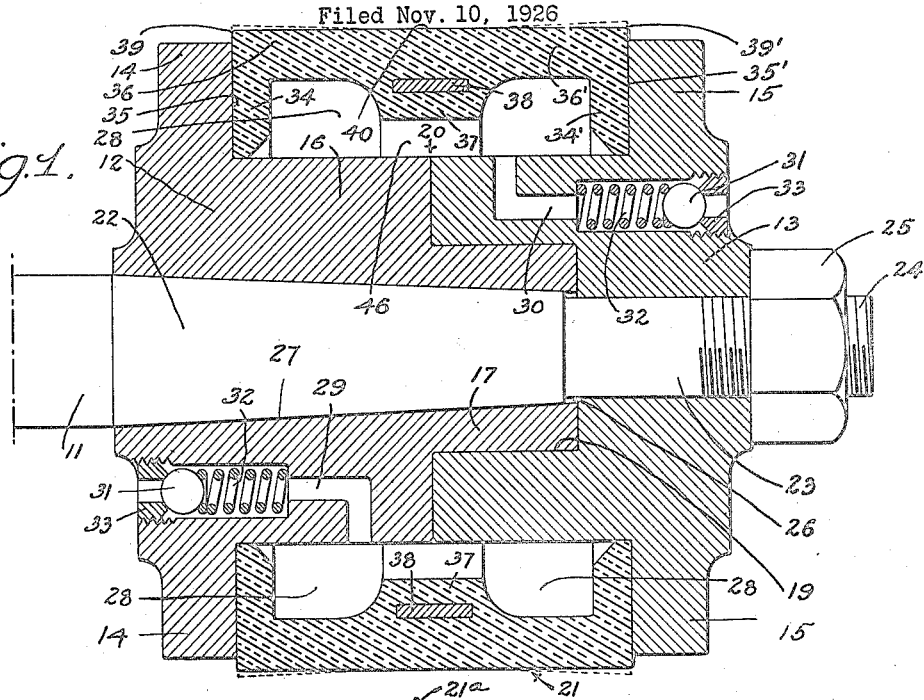

Referring to the details of that specific embodiment of my invention illustrated in Fig. 1, I show a plunger body as secured upon a rod 11 and as comprising interfitting members 12 and 13,—said members respectively comprising outwardly extending flanges 14 and 15 and respectively including parts 16 (having an extension 17) and 18 (having a corresponding cavity 19) of a central section 20, surrounded by a floating packing sleeve 21, which is shown as centrally thickened.

The rod 11 is shown as comprising a tapered portion 22 and a reduced end portion 23,—the latter being threaded at 24 for engagement by a nut or nuts 25. A sufficient clearance is preferably left at 26, to permit the members 12 and 13 to be effectively drawn together, even after the tapered portion 22 of said rod (interfitting with a correspondingly tapered cavity 27 in the member 12) becomes somewhat worn; and, in order to admit fluid pressure to a single circumferential channel 28, as provided by the reduced central sections 20 and the outwardly extending flanges 14 and 15, I may provide the respective members 12 and 13 with valved passages, as indicated at 29 and 30,—ball valves 31 being shown as outwardly pressed by springs 32. The compressive action of these springs may be varied by rotative adjustment of threaded seat members 33.

It will be obvious that the described construction of a plunger body is more advantageous than the use of a one-piece body, in that it is favorable to compensation for wear and to assembly and disassembly; but I desire herein to emphasize more particularly the character and advantages of packing sleeve of the general type illustrated.

Each of my packing sleeves may comprise a unit having a substantially cylindrical outer surface when subjected to no internal pressure; but I show the same as comprising inwardly extending flanges 34, 34', adapted respectively to be held by interior pressure against inner radial surfaces 35, 35'—provided by the respective flanges 14 and 15; and it is an important feature of my novel packing sleeves that, although the mentioned inwardly extending flanges 34, 34', and cylindrical portions 36, 36' with which said inwardly extending flanges are shown as integrally connected, may be sufficiently flexible and extensible to permit outward movement in response to internal pressure, a central portion of each of said packing sleeves is intended to be so thickened (as at 37) or so bound or reinforced, as to practically prevent outward movement of the central portion of said packing sleeve.

Figure 2:
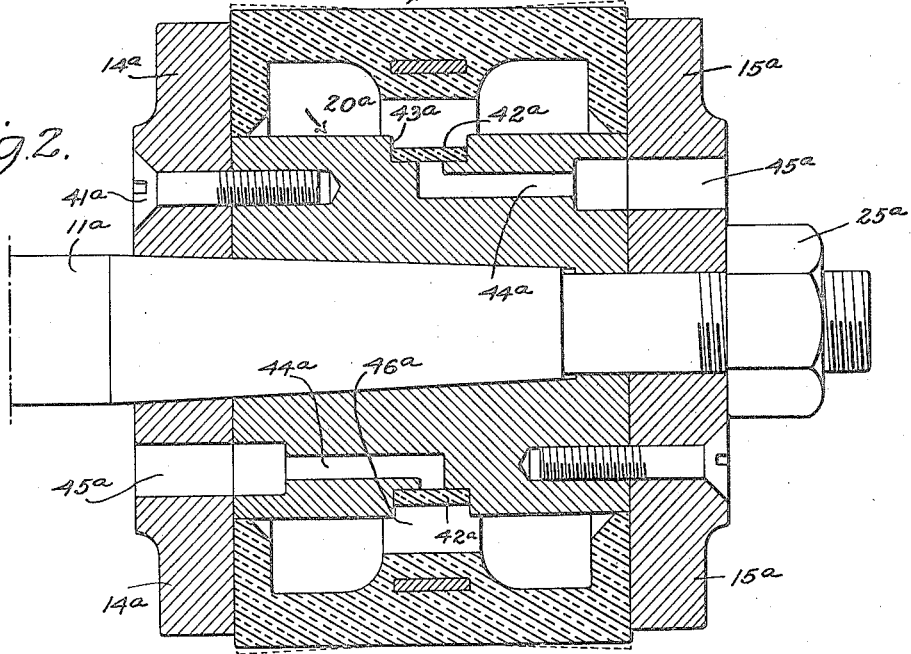
Fig. 2 is a view similar to Fig. 1, but showing an alternative type of plunger body,—said body being provided with a simple alternative type of valve means for checking return movement of fluid from an annular channel beneath a packing sleeve.

The reinforcing and/or restraining member 38, band-like in general form and shown as imbedded or internal, may be either non-metallic or metallic, being preferably cast into the packing sleeve in advance of a vulcanizing operation, in case said sleeve is formed of a rubber composition,—the important point being that, although the respective edges 39, 39' may be pressed outward, substantially as indicated by dotted lines in Figs. 1 and 2 (to assure a satisfactory fit, preventing leakage past said sleeve, and compensating for wear) the central region 40 is prevented from participating in such outward movement, thereby obviating useless friction and prolonging the life of said sleeve. As the edges wear, they are pushed farther out.

In Fig. 2, in which I show a packing sleeve 21ª substantially like that illustrated in Fig. 1, the main body of a plunger is shown as comprising three sections, rather than one or two,—a reduced central section 20ª being shown as distinct from end flanges 14ª and 15ª. The latter may be secured thereto by the clamping action of a nut 25ª upon the end of rod 11ª, or they may be secured together by means such as screws 41ª,—an important feature of novelty in the organization shown in Fig. 2 being my use of a very simple and effective valve organization comprising a single and comparatively heavy rubber band 42ª, shown as disposed within a peripheral channel 43ª. This band partially fills said channel in such manner as to be retained thereby although permitting ingress and preventing egress of fluid through passages shown at 44ª in the central section 20 and at 45ª in the flanges 14ª and 15ª.

Figure 3:
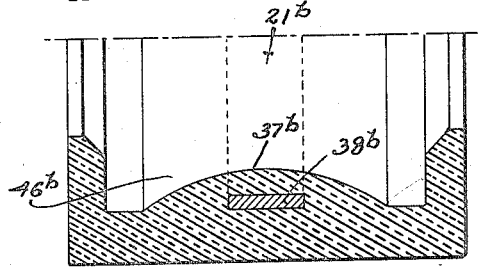
Fig. 3 is a detail view, separately showing in half section, an alternative type of packing sleeve.

By way of emphasizing the fact that the interior configuration of my packing sleeves may be varied, I show in Fig. 3 an alternative form in which a central region 37ᵇ is inwardly thickened in such manner as to provide a rounded surface,—the use of reinforcing band 38 or 38ᵇ being entirely optional, and all embodiments of my invention being such as to provide a single pressure chamber (46, 46ª, 46ᵇ) surrounding a central section of the plunger body and within a packing sleeve.

It will be obvious that a pump plunger of the general character described may be used, in a known manner, to pump slush or another fluid to which one or both of the flanges 14, 15 (or 14ª, 15ª) may be exposed, fluid pressure being transmitted through the passages 29 and 30 (or 44ª, 45ª) into the annular space 46,—thereby forcing both edges of the packing sleeve 21 (or 21ª or 21ᵇ) outward into satisfactory contact with a cylinder wall, to avoid leakage past said plunger and to assure a high efficiency in the operation thereof; and, although all of the described parts may be, as shown, of comparatively rugged construction, the described packing sleeve is especially advantageous not only as providing automatic means to assure and maintain a satisfactory fit but as providing automatic means for expanding the edges thereof to compensate for wear.

Although I have herein described alternative embodiments of my invention, it should be understood not only that various features described may be independently employed but also that numerous modifications, additional to those herein described, which might easily be devised by those skilled in the arts to which this case relates,—without involving the slightest departure from the spirit and scope of my invention as the same is indicated above and in the following claims.

I claim as my invention:

1. In a pumping organization: a plunger body comprising a central section disposed between outwardly extending radial flanges which cooperate therewith in providing a single annular chamber; means for admitting fluid pressure into said annular chamber from one end of said body; and a packing sleeve floating in said annular chamber and provided with means for restraining a central portion thereof, said pressure-admitting means being provided with an inwardly opening valve consisting of a band of yieldable material extending over said fluid passages formed in said central section.

2. In a pumping organization: a plunger body comprising a central section disposed between outwardly extending radial flanges which cooperate therewithin providing a single annular chamber; means for admitting fluid pressure into said annular chamber from one end of said body; and a packing sleeve floating in said annular chamber and provided with means for checking outward movement of the central portion thereof; said checking means comprising a reenforcing band.

3. An organization of the general character defined in claim 1 in which said means for checking outward movement of the central portion of said packing sleeve comprises a reinforcing band, about which said sleeve is cast.

4. For use in a pump plunger: a packing sleeve comprising a cylindrical body which is provided with inwardly extending flanges at its respective ends and with means for restraining its central portion against outward movement, said restraining means comprising a band imbedded therein.

5. In a pumping organization: a plunger body comprising a central section disposed between outwardly extending radial flanges which cooperate therewith in providing a single annular chamber; means for admitting fluid pressure into said annular chamber; and a packing sleeve floating in said annular chamber, said pressure-admitting means being provided with an inwardly opening valve consisting of a band of yieldable material extending over fluid passages formed in said central section.

6. In a pumping organization: a plunger body comprising a central section disposed between outwardly extending radial flanges which cooperate therewith in providing a single annular chamber; means for admitting fluid pressure into said annular chamber; and a packing sleeve floating in said annular chamber, said pressure-admitting means being provided with an inwardly opening valve consisting of a band of elastic material extending over fluid passages formed in said central section.

In testimony whereof, I have hereunto set my hand at Los Angeles, California, this 2nd day of November, 1926.

WAYNE N. SUTLIFF.